(12) United States Patent  (10) Patent No.: US 7,444,295 B2
Peachey-Kountz et al.  (45) Date of Patent: *Oct. 28, 2008

(54) SINGLE LEVEL BILL OF MATERIAL AVAILABLE TO PROMISE

(75) Inventors: Penny Jeanette Peachey-Kountz, South Burlington, VT (US); Robert Eugene Rice, Essex Junction, VT (US); Geetaram Savlaram Dangat, Naperville, IL (US); Rahul Jindani, South Burlington, VT (US); Rahul Nahar, South Burlington, VT (US); Srinivasa Govinda Kuthethur, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/831,955

(22) Filed: Jul. 31, 2007

(65) Prior Publication Data

US 2007/0271132 A1  Nov. 22, 2007

Related U.S. Application Data

(63) Continuation of application No. 10/678,096, filed on Oct. 6, 2003, now Pat. No. 7,308,416, which is a continuation of application No. 09/225,130, filed on Jan. 4, 1999, now abandoned.

(51) Int. Cl.
*G06F 19/00* (2006.01)

(52) U.S. Cl. .............................. 705/8; 700/99; 700/107; 705/28

(58) Field of Classification Search ....................... None
See application file for complete search history.

(56) References Cited

U.S. PATENT DOCUMENTS

| 5,630,070 | A | * | 5/1997 | Dietrich et al. ................ 705/8 |
| 5,764,543 | A | * | 6/1998 | Kennedy ........................ 703/2 |
| 5,832,532 | A | * | 11/1998 | Kennedy et al. ............ 715/503 |
| 5,845,258 | A | * | 12/1998 | Kennedy ........................ 705/8 |
| 5,930,156 | A | * | 7/1999 | Kennedy ........................ 703/6 |

(Continued)

OTHER PUBLICATIONS

Vollman, Thomas E. et al. Manufacturing Planning and Control Systems. New York: Irwin/McGraw-Hill, 1997, pp. 205-228, 251, 312-333, 344-345.*

*Primary Examiner*—Beth Van Doren
*Assistant Examiner*—Dave Robertson
(74) *Attorney, Agent, or Firm*—Whitham, Curtis, Christofferson & Cook, PC; Richard M. Kotulak

(57) ABSTRACT

A computer implemented Availability Checking Tool wherein tool users work within a common work environment, from common enterprise data, and considering assets and demands across multiple order management systems and manufacturing facilities within boundaries established by manufacturing specifications, process flows and business policies. Tool users can easily maintain a synergistic relationship between orders from multiple demand sources or ordering systems. A demand configurator receives demand information from each demand source and coordinates product requests in accordance with customer request rules and priorities. A supply configurator receives manufacturing and planning data from a planning source and manipulates the received manufacturing and planning data to create new supply data. A material resource engine provides material supply information from the new supply data, the received demand information following product supply rules and priorities. A solver optimizes product availability information in response to the material supply information, product supply rules and priorities.

18 Claims, 6 Drawing Sheets

U.S. PATENT DOCUMENTS 5,943,244 A * 8/1999 Crawford et al. ............... 703/13
5,983,194 A * 11/1999 Hogge et al. ................... 705/7
6,047,290 A * 4/2000 Kennedy et al. ........ 707/103 R
6,167,380 A * 12/2000 Kennedy et al. ............... 705/10
6,188,989 B1 * 2/2001 Kennedy ....................... 705/8
6,963,847 B1 * 11/2005 Kennedy et al. ............... 705/8

* cited by examiner

SUPPLY LINE

| PERIOD 1 | PERIOD 2 | PERIOD 3 | PERIOD 4 | PERIOD 5 |
|---|---|---|---|---|
| 100 | 100 | 100 | 100 | 100 |

DEMAND

| PERIOD 1 | PERIOD 2 | PERIOD 3 | PERIOD 4 | PERIOD 5 |
|---|---|---|---|---|
|  | 300 |  |  |  |

AVAILABLE TO PROMISE

| PERIOD 1 | PERIOD 2 | PERIOD 3 | PERIOD 4 | PERIOD 5 |
|---|---|---|---|---|
| 0 | 0 | 0 | 100 | 100 |

FIG.1    PRIOR ART

|   | DEMAND TYPE | DEMAND CLASS |
|---|---|---|
| 1 | BACKORDER | 1 |
| 2 | FIRM-ORDER | 2 |
| 3 | ORDER MOVE-IN | 3 |
| 4 | ORDER MOVE-OUT | 4 |
| 5 | NEW REQUEST | 6 |
| 6 | UNSATISFIED REQUEST | 6 |
| 7 | FORECAST | 9 |

FIG.3

SUPPLY LINE 60

| PERIOD 1 | PERIOD 2 | PERIOD 3 | PERIOD 4 | PERIOD 5 |
|---|---|---|---|---|
| 100 | 100 | 100 | 100 | 100 |

ALLOCATION 62

| FORECAST GROUP | PERIOD 1 | PERIOD 2 | PERIOD 3 | PERIOD 4 | PERIOD 5 |
|---|---|---|---|---|---|
| FORECAST GROUP 1 | 20 | 20 | 50 | 50 | 20 |
| FORECAST GROUP 2 | 80 | 80 | 50 | 50 | 80 |

DEMAND 64

| FORECAST GROUP | PERIOD 1 | PERIOD 2 | PERIOD 3 | PERIOD 4 | PERIOD 5 |
|---|---|---|---|---|---|
| FORECAST GROUP 2 |  | 300 |  |  |  |

PROFIT ATP 66

| FORECAST GROUP | PERIOD 1 | PERIOD 2 | PERIOD 3 | PERIOD 4 | PERIOD 5 |
|---|---|---|---|---|---|
| FORECAST GROUP 1 | 20 | 20 | 50 | 50 | 20 |
| FORECAST GROUP 2 | 0 | 0 | 0 | 0 | 40 |

FIG.2

SINGLE LEVEL BILL OF MATERIAL AVAILABLE TO PROMISE

RELATED APPLICATION

This present invention is a continuation of U.S. patent application Ser. No. 10/678,096 filed Oct. 6, 2003, now U.S. Pat. No. 7,308,416 as a continuation of Ser. No. 09/225,130 filed Jan. 4, 1999, now abandoned, both of which are incorporated herein by reference. The present application also is related to U.S. patent application Ser. No. 08/926,131 and now U.S. Pat. No. 5,971,585 entitled "Best Can Do Matching of Assets with Demand in Microelectronics Manufacturing" to Dangat et al., filed Sep. 9, 1997 and to U.S. patent application Ser. No. 09/225,150 now (U.S. Pat. No. 6,463,345) entitled "Regenerative Available to Promise", to Peachey-Kountz et al. filed coincident with parent U.S. patent application Ser. No. 09/225,130, both assigned to the assignee of the present invention and both incorporated herein by reference.

BACKGROUND OF THE INVENTION

1. Field of the Invention

The present invention generally relates to computer implemented planning resources and decision support tools and, more particularly, to a tool in which production planning information is used to match assets to demands.

2. Background Description

In a complex manufacturing environment such as semiconductor manufacturing, it is very difficult to predict the availability of components/parts. Currently existing planning tools used for predicting availability include spreadsheets and manual calculations. Most planners use a spreadsheet to combine supply and demand information for managing parts and components, and for making reasonably accurate product forecasts.

However, at each production stage, there may be several byproducts or production options that complicate the whole manufacturing scenario. So, in addition to which option to select, product planners must consider which byproduct might be produced. Tracking all projected information receipts with a spreadsheet, while simultaneously attempting to minimize byproduct manufacture is both time consuming and very likely, not very accurate. Further, manually doing the same task is even more difficult. Thus, regardless of which prior art method used, it is nearly impossible to achieve an optimum solution.

Further, most current tools use calculator like logic to predict part availability for each individual time period. Typically, part availability is determined by subtracting Demand and Reservations from Total Supply. However, the total available supply either must be known or, projected supply must be entered, manually. Unfortunately, this data is not available, typically, and so, the above availability check yields a zero result. Thus, due to lack of data, these simple tools cannot give a projected delivery date.

So, to project part availability dates, more advanced, state of the art tools either use part production cycle time for projections or, rely on historic information. Still, in a large and complex manufacturing environment, these state of the art tools fall short, resulting either in a sub-optimal solution or predicting an erroneous availability date.

The tables of FIG. 1 show a simple behavioral example of a typical traditional prior art availability system. The system of the example of FIG. 1 includes a table 50 for supply, a table 52 for demand and a table 54 indicating excess capacity, i.e., the capacity available to promise (ATP). From supply table 50, 100 pieces are produced during each production period, e.g., every day. From demand table 52, there is a firm order in Period 2 of 300 pieces. Thus, the supply from Period 1, Period 2 and Period 3 are dedicated to satisfy that firm order of 300 pieces. So, the ATP table 54 shows 100 pieces available in each of Period 4 and Period 5. Consequently, to respond to a new request, the best recommendation from this prior art system is to fill the new request with parts from Period 4 and/or Period 5.

This example of prior art availability allocation represents what is known as Demand Prioritization. The ATP quantity is determined by netting demand against supply. Thus, current demands are filled first from available supply with remaining excess supply being tagged as ATP, i.e., Available To Promise.

In traditional prior art ATP systems, all customers are treated equally and, new commitments are made on a first come first served basis. These prior art systems did not make distinctions between requests from a higher priority customers (e.g., tier 1) and lower priority customers (tier 3). Further, system users of these prior art systems did not have any capability of prioritizing demands, giving higher priority to higher tier customers' demand. Consequently, demand from lower tier customers could not be overridden by demands from higher tier customers.

Additionally, capacity could not be reserved for important customers on these prior art systems, which could not preallocate or reserve portions of output for a particular customer. Typically, for these prior art systems, order commitment was based on Supply Determination, i.e., determining supply coming to stock or, supply already available as inventory. The common prior art supply determination models are: Setting supply equal to the forecasted demand; and Basing end product availability on sub-components availability, i.e., those sub-components used in producing the product supplied.

Unfortunately, the disadvantage of the former method of basing supply on demand is that output or supply is based on a demand forecast and, therefore, is only as good as the forecast. The disadvantage of the latter method of basing supply availability on sub-component availability is that it results in myopic Inventory allocation, failing to take into account the business impact of each allocation.

A standard semiconductor industry practice called "Binning" makes this latter prior art method especially unsuitable for semiconductor manufacturing. Where manufacturing a part provides variations of the part due to normal manufacturing parameter variations, the parts may be sorted according into separately identified groups, e.g., fast parts, slow parts and normal parts. This is referred to as binning.

As a result of normally unpredictable manufacturing process variations, the number of parts falling into each "bin" varies from production lot to production lot. So, one lot may produce fewer fast parts and more normal parts than expected, while another lot may produce fewer than expected slow parts. Satisfying demand using binned sub-components, for this latter ATP method, may use more sub-components than necessary. As a result, projected ATP is lower than what the enterprise is actually capable of producing.

In some instances shortfalls may be avoided where, for example faster parts may be substituted, transparently, for slower parts. Further, such substitutions may be time-dependent, i.e., based on business decisions, allowing, over time, changing or halting the substitution. Prior art ATP systems could not handle these on the fly decisions.

Furthermore, the manufacturer may resort to second sourcing or out sourcing for the same part. Also, alternate processes may be modeled to reflect alternate bills of material resulting in different sub-components, which these prior art ATP systems also cannot handle. Instead, these prior art ATP systems ignore manufacturing capacity and consider only sub-component availability.

Thus, basing commit orders on supply availability, prior art ATP systems require manual intervention, because these prior art systems are unable to recognize important customers and allocate supply, however limited, accordingly. Consequently the prior art ATP system user must compensate for prior art ATP system shortcomings.

For example, a customer order may have multiple delivery dates. The prior art ATP system user must decide whether to complete the order with supply available on each requested date; determine the latest date when the entire supply will be available and commit to that date; or, fill the order according to the schedule proposed by ATP system. The prior art ATP system user must make this decision for each individual order.

Another limitation of prior art ATP systems is that they are connected, generally, to a single ordering system, and are not capable of accepting orders from multiple lines. This lack of horizontal integration results in potential commit errors because all demands from other ordering system are not reflected in a single common ORDER BOOK. Consequently, there may be system downtime to periodically synchronize supply and demand as required in these prior art ATP systems. This synchronization is done, for example, using batch programs.

Another shortfall of these prior art ATP systems is that supply generation is not linked, explicitly, with demands and requests on hand. Consequently, very often this results in excess part supply with no demand, and with limited or no availability for high demand parts.

Thus, there is a need for an integrated ATP system capable receiving orders from multiple ordering systems, providing a scheduled date of when ordered material can be supplied and the quantity that can be supplied on that date in response to the customer's preselected requirements.

SUMMARY OF THE INVENTION

It is therefore a purpose of the present invention to provide an integrated tool for providing recommendations to users for what is Available to Promise;

It is another purpose of the present invention to provide a system that upon a customer request, provides a date when material can be supplied and quantity that can be supplied on that date;

It is yet another purpose of the present invention to provide recommendation to users for what is Available to Promise using the latest asset and demand picture;

It is yet another purpose of the present invention to avoid violating business rules of order acceptance while providing recommendations to users for what is Available to Promise;

It is yet another purpose of the present invention to provide recommendation to users for what is Available to Promise in a real-time multiprocessing environment, enabling multiple users to use the system simultaneously on multiple order entry systems.

The present invention is a computer implemented Availability Checking Tool enabling tool users to execute within a common work environment, from common enterprise data on a single level bill of material and the method of operating the tool. The preferred embodiment checking tool considers assets and demands across multiple order management systems and manufacturing facilities within boundaries established by manufacturing specifications and process flows and business policies. The tool permits tool users to easily maintain a synergistic relationship between multiple ordering systems. Customer business rule level definition are supported to provide the tool users with the power to micro-manage, optimally, enterprise assets and demands.

The preferred embodiment tool includes one or more individual demand sources for inputting demand information. A demand configurator receives demand information from each said at least one demand source and coordinates product requests responsive to the demand information in accordance with customer request rules and priorities. A supply configurator receives manufacturing and planning data from a planning source and manipulates the received manufacturing and planning data to create new supply data. A material resource engine provides material supply information from the new supply data, the received demand information following product supply rules and priorities. A solver for optimizes product availability information in response to the material supply information, product supply rules and priorities.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is an example of supply allocation on a typical traditional prior art availability system;

FIG. 2 is an example of supply allocation on a preferred embodiment available to promise (ATP) system;

FIG. 3 is a Demand Class table for the preferred embodiment of the present invention, which allows customer orders to be prioritized and categorized;

DETAILED DESCRIPTION OF A PREFERRED EMBODIMENT OF THE INVENTION

Figure 4:
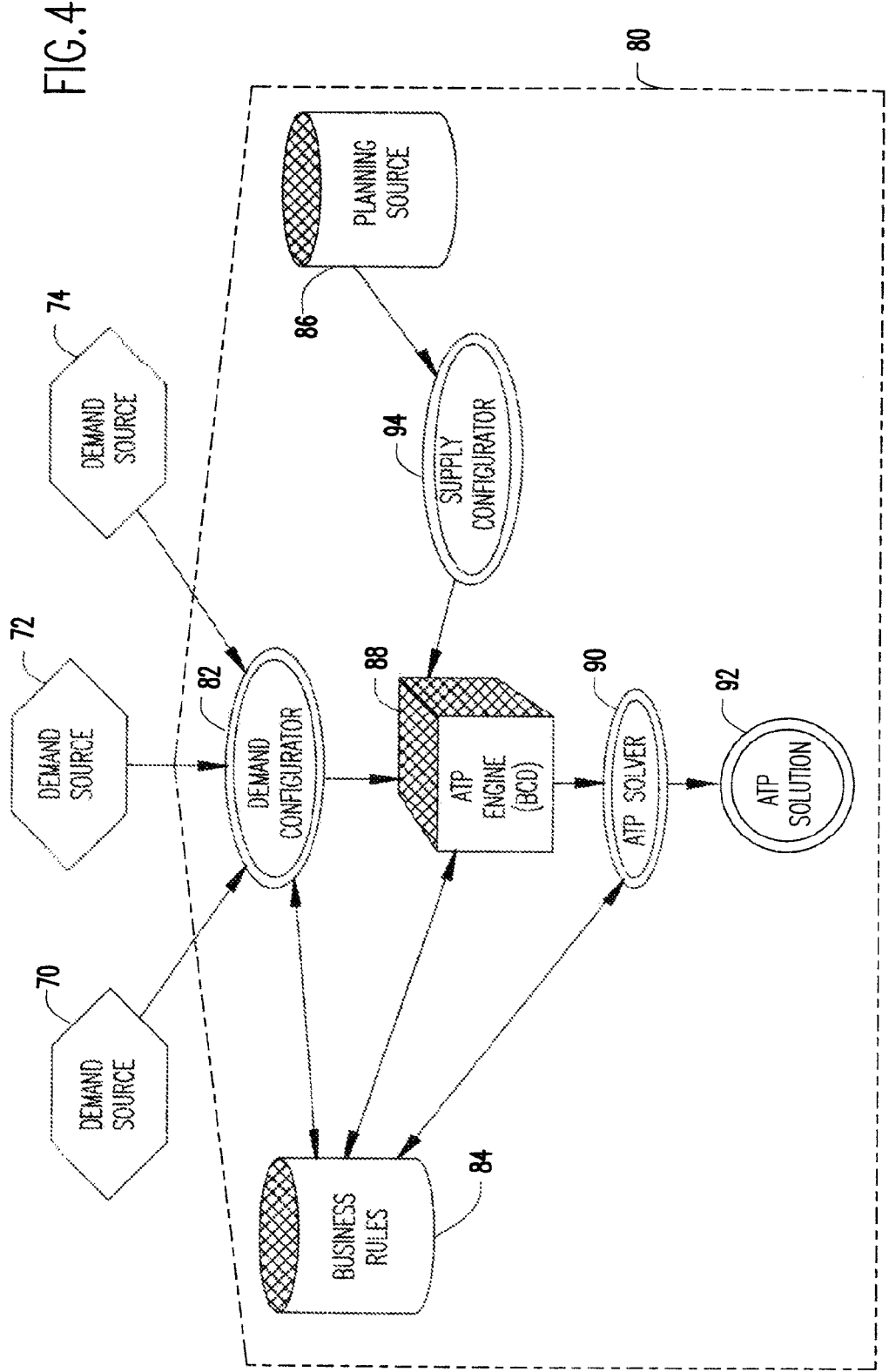
FIG. 4 is a block diagram of the preferred embodiment PROFIT ATP system.

Referring now to the drawings, and more particularly to FIG. 2, which is behavioral example of a preferred embodiment Single Level Bill of Material Available to Promise system. This Example includes a table 60 for supply, a supply allocation table 62, a demand table 64, and a PROFIT ATP table 66.

As can be seen from supply table 60, periodic output, e.g., day by day, is 100 pieces. For the present invention, supply is allocated in allocation table 62 to user-defined forecast groups, e.g., Forecast Group1 (containing for example high priority tier 1 customers) and Forecast Group2 (containing lower priority tier 3 customers). From demand table 64, there is a firm order at hand for 300 pieces in Period 2 placed by Forecast Group2 customers. Thus, the forecast allocation in Period 1 (80), Period 2 (80), Period 3 (50), Period 4 (50) and Period 5 (80) is used to satisfy the firm order of 300 pieces for Forecast Group2.

What remains available to promise from the preferred embodiment PROFIT ATP system, as can be seen from PROFIT ATP table66, is the allocation for Forecast Group1 and, the excess for Forecast Group2 in period 5, i.e., 20 pieces each in Periods 1, 2, and 5, and 50 pieces each in Periods 3 and 4. Further, for Forecast Group2, 40 pieces are available to promise in Period 5. So, for customers making new material requests, the best that the system can recommend is 40 pieces in Period 5 for a Forecast Group2 customer and, for a Forecast Group1 customer, 20 pieces in each in Periods 1, 2, and 5, and 50 pieces each in Periods 3 and 4.

As a result, the preferred embodiment of PROFIT ATP system clearly distinguishes between high tier customer orders and lower tier customer orders by allocating supply between Forecast Group1 and Forecast Group2. The supply allocated for Forecast Group1 is not available for orders from Forecast Group2 customers. By allocating supply by forecast group, the preferred embodiment PROFIT ATP enables reserving supply for important customers and, also, identifying or associating supply with a specific demand, improving supply allocation.

Preferably, the supplying plant, material, customer location, and shipping location are grouped as forecast groups. Customer orders are fulfilled such that they may each consume the available supply from the customer's own forecast group. Each forecast group may have more than one customer and is assigned a tier and rank. A particular forecast group's tier and rank determines that forecast group's importance with respect to other forecast groups.

Each forecast group has a set of business rules associated with it. The associated set of business rules determines how each customer's order is filled within the group. Thus, the inclusion of forecast groups allows PROFIT ATP to group customers based on geographical location and importance to the supplier's business.

In addition, orders provided to the preferred embodiment PROFIT ATP system include a Demand class, an example of which is provided by the table of FIG. 3. The order's demand class allows each customer order to be prioritized and categorized as a backorder, a firm orders, an order move-in, an order move-out, or a new requests. Having classified an order with its demand class, orders may be prioritized to determine which demand consumes assets, and the order in which the orders consume assets, based on date the order was committed.

In the preferred embodiment, the supply line, as represented in table 60, generated by a PROFIT BCD engine at the forecast group level. A configuration table associates the generated supply line with a demand class for each particular customer order. This association enables the preferred embodiment PROFIT ATP system to determine the supply available for each customer and, also, the type of order for which the supply was created, i.e., backorders, firm orders, order move-ins, order move-outs and new requests.

The preferred PROFIT ATP system of the present invention uses PROFIT BCD engine 88 as described in U.S. patent application Ser. No. 08/926,131 and now U.S. Pat. No. 5,971,585 entitled "Best Can Do Matching of Assets with Demand in Microelectronics Manufacturing" to Dangat et al., filed Sep. 9, 1997, referred to hereinafter as "PROFIT BCD" assigned to the assignee of the present invention and incorporated herein by reference.

The PROFIT BCD engine matches each enterprise's assets, i.e., its output or supply, to the customer orders and, then, generates an optimized supply line based on customer, demand class and order commit date. The PROFIT BCD engine works within manufacturing specifications such as build options, BOM, yields, cycle times, receipt dates, capacity consumed, capacity available, substitutions, binning and shipping times. So, for the preferred embodiment of the present invention, the PROFIT BCD engine receives enterprise assets such as STARTS (starts required at the lowest level of bill of materials (BOM)), work in progress (WIP), inventory, purchases, capacity and, matches that input with existing and projected requirement, i.e., demands provided by PROFIT ATP.

The PROFIT BCD engine automatically handles complex semiconductor industry issues such as binning, substitutions and alternate processes. Rules of substitutions and alternate processes can be user-specified and varied over time to handle day-to-day decision making. By handling these semiconductor industry issues, the PROFIT BCD engine eliminates problems that would otherwise occur such as vastly over-stated STARTS.

In the preferred embodiment of the present invention, customer orders (demands) are treated as inputs to the PROFIT BCD engine. These demands are manipulated to generate a supply line, e.g., table 60, at forecast group level. Each forecast group has supply allocated for it and determines which customers belonging to that group can consume the group's allocated supply. This allocation enables PROFIT ATP to reserve some output for important customers, to insure that lower priority customers do not consume the output set aside for those important customers. As a result, the preferred embodiment PROFIT ATP system is superior to prior art ATP systems, which constrained to allocating supply on a first come first served basis.

Further, the preferred embodiment PROFIT ATP system allocates supply according to user specified rules that are set up to handle each customer's delivery proposal requirements. These user specified rules guide the preferred embodiment PROFIT ATP system to decide, automatically, whether an order is completed from supply available on the requested date, if the order is committed on the last supply availability date, or, if the order is completed on different schedule dates proposed by the PROFIT ATP-system.

So, continuing the example of FIG. 2, if the preferred embodiment PROFIT ATP system receives a new request of 80 pieces in time Period 2 for a Forecast Group1 customer, based on customer requirement, the system may recommend: 40 pieces in time Period 2; 80 pieces in time Period 3; or, 40 pieces in time Period 2 and 40 pieces in time Period 3. Since supply is based on forecast group level, the preferred embodiment PROFIT ATP system automatically recognizes reservations for important customers. Thus, manual intervention is unnecessary to commit orders for a limited supply.

The preferred embodiment single level bill of material ATP system is flexible, allowing ORDER BOOKS on multiple platforms to be linked in a single ATP process. Thus, as a result of this integration, the preferred embodiment ATP system receives and responds to demands in real-time. Further, preferred embodiment systems avoid downtime required for integrating demands from individual ordering systems otherwise incurred by prior art ATP systems.

Additionally, the supply generation process is explicitly linked with demands and requests on hand in the preferred embodiment PROFIT ATP system. Consequently, the PROFIT BCD engine system automatically recognizes demands (priorities assigned by demand class and date committed). So, parts for which there is little or no demand, this demand recognition enables the system to automatically reduce manufacturing and, instead, shift manufacturing resources to increase high demand part production.

Preferably, the present invention uses what is typically known as an online server on a Unix based machine, and more preferably AIX from IBM Corporation. Alternatively, other similar environments such Windows NT from Microsoft Corporation or Mainframe based systems may be suitable substitutes. Preferably, the online server system interfaces directly to the order-entry system (or systems) and maintains, what is typically referred to as a real time picture of the orders. The order-entry system(s) are tied to the server, referred to as the ATP server, using messaging middleware, preferably MQ series messaging middleware from IBM Corporation. The ATP recommendation is also passed back to the online order-entry system(s) using the MQ series messaging middleware.

FIG. 4 is an overview of the preferred embodiment ATP system of the present invention. Demand source boxes 70, 72 and 74 represent different order-entry sources connected to the PROFIT ATP system 80. Order-entry systems 70, 72 and 74 send new requests, order confirmation or order changes to the ATP system 80. These orders/requests are stored in a repository (not shown) called a Demand file.

Demand Configurator 82 processes customer orders (demands) according to predefined business rules 84. The business rules 84 are rules dictating how to handle customer orders based on the customer's importance to the user's business and, also, are rules for recommending to users how to fill those orders. Demand Configurator 82 ensures that the PROFIT ATP system can identify, prioritize and the distribute the user's business assets according to pre-defined priorities such as customer importance.

Manufacturing and planning related information from Planning Source 86, necessary to run the PROFIT engine (PROFIT BCD) 88, are passed to the PROFIT ATP engine 88. The output of ATP engine 88 and business rules 84 are passed to the ATP solver 90, to generate the ATP solution 92.

The preferred embodiment PROFIT BCD engine 88 provides a heuristic solution to adjust product STARTS for time and capacity feasibility. The PROFIT BCD engine 88 requires asset information about the enterprise, including planned STARTS (starts at the lowest level of the BOM), work in progress (WIP), inventory, purchases and both tooling and manpower capacity. The enterprise demands include firm orders, forecasted orders, and inventory buffer. The PROFIT BCD engine 88 manages the enterprise assets against demands using manufacturing guidelines and specifications. These specifications are available as build options (BLDOPT), bill of materials (BOM), yields, cycle times, receipt dates, capacity consumed, capacity available, substitutions (allowable substitutions), binning or sorting, and shipping times.

The planning resource 86 receives current PRFTIN files to drive the PROFIT ATP engine 88. These current PRFTIN files include build options (BLDOPT), bill of materials (BOM), inventory data (INV), inventory policy (INVCOST), new effective plan date (PLANDATE), part number detail (PND), receipts (RECPT), yields (YLD), yields per work center (YLDWC), capacity available (CAPAVAIL), capacity required (CAPREQ), substitutions (SUB), binning (BIN), and DEMAND (DEM) files.

At this point, the preferred embodiment single level BOM system does not create fresh STARTS, but instead, checks work out of the supply line generated as described in U.S. patent application Ser. No. 09/225,150 now (U.S. Pat. No. 6,463,345) entitled "Regenerative Available to Promise", to Peachey-Kountz et al. (hereinafter "Regenerative ATP") filed coincident herewith, assigned to the assignee of the present invention and incorporated herein by reference.

Figure 5:
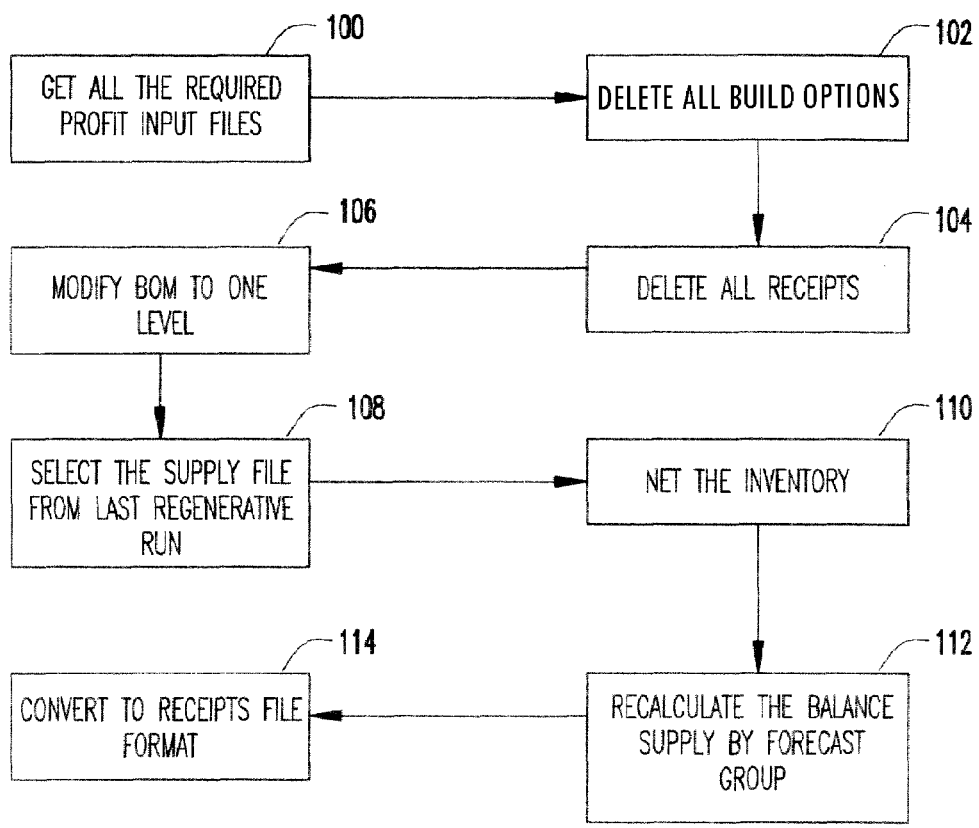
FIG. 5 shows the preferred embodiment Supply Configurator wherein Input Files are manipulated so that no new starts are recommended, and the bill of material trimmed to single level.

As can be seen from FIG. 5, which shows the preferred embodiment Supply Configurator 94, in step 100 the PROFIT input files are retrieved. Then, in step 102, to avoid triggering fresh STARTS, the preferred embodiment PROFIT ATP engine 88 deletes all records of the Build Options (BLDOPT) file. Also, in step 104, all receipts are deleted. Since, for the material of interest, the preferred embodiment single level BOM system works with one level BOM, in step 106, all records in BOM file are deleted except for the one level BOM of material of interest. Then, in step 108, the supply file from the last regenerative run is selected. In step 110, the inventory on hand is netted and the balance of the supply is recalculated in step 112 and in step 114, the result is converted to Receipts FILE format.

As a result, information used for driving planning and manufacturing activities is also used for order-commit. Thus, the recommendation of the preferred embodiment PROFIT ATP is superior to results from prior art systems because it is much more realistic and much more accurate.

The PROFIT ATP 88 generates a customer level supply line in the supply table. So, the supply may be mapped against actual demand because the supply line is also associated with demand classes, relating the importance of the demand to the business. By taking advantage of this mapping feature of the PROFIT ATP engine 88, demand priorities are set based on user/business requirements simultaneously with mapping supply to actual demand. Thus, preferred embodiment PROFIT ATP system users may group customers by forecast group and, thereby, generate supply availability at the forecast group level.

Figure 6:
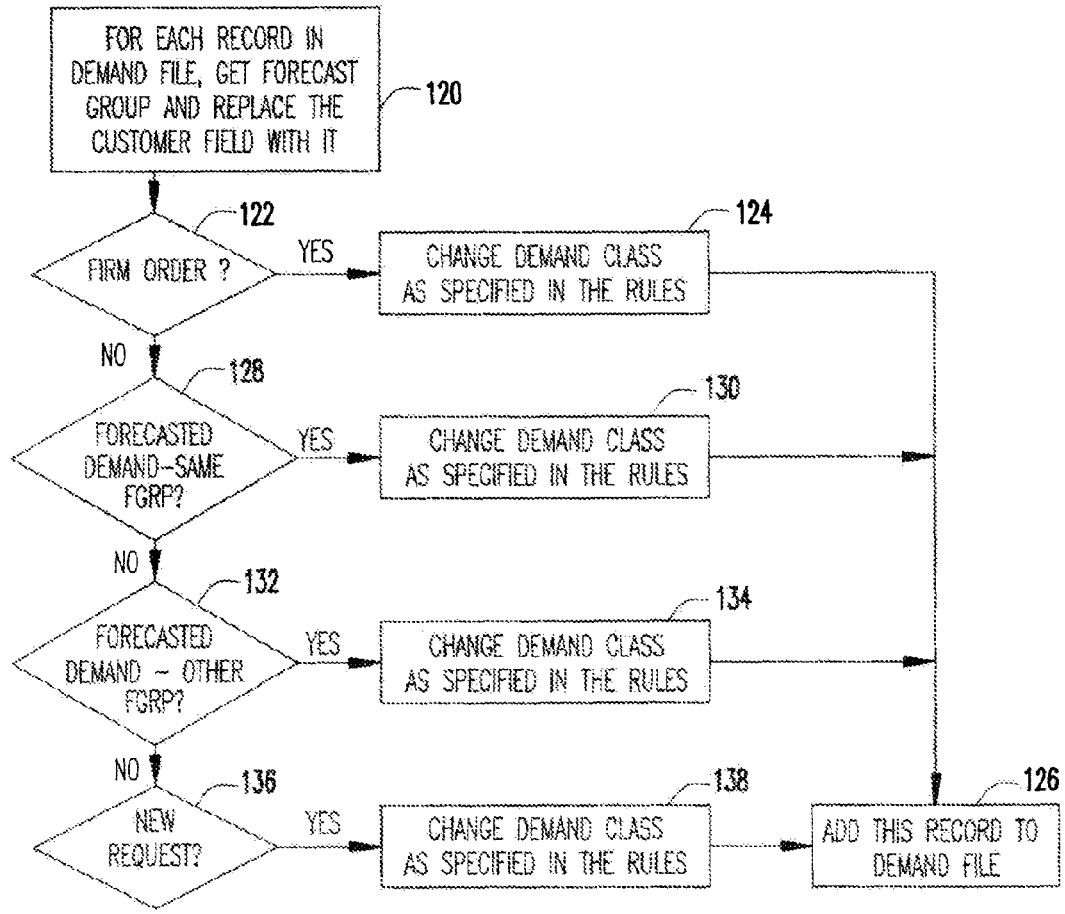
FIG. 6 shows the method executed by the Demand Configurator of configuring demands according to the importance of the orders to the business.

FIG. 6 is a block diagram of the Demand Configuration process executed by Demand Configurator 82. For the Demand Configuration process, demands from all order-entry sources are collected into a demand file. An example of demand types and user-defined demand class values is provided in the table of FIG. 3.

So, in step 120, as each individual demand record is retrieved from the demand file:

1. The forecast group of the retrieved demand record is determined from the PROFIT ATP rules table 84 by matching a supplying plant, material, customer location and shipping location.

2. In step 122, if the demand record is identified as a firm order, then in step 124, its demand class is modified to the value specified in the PROFIT ATP configuration table, 2 in the example of FIG. 3, and in step 126 the modified record is added to the Demand file; otherwise, it is passed to step 128 for additional processing.

3. In step 128, for a forecasted demand, a determination is made whether the demand belongs to the same group: if the forecasted demand belongs to the same group as the request. Its demand class is changed in step 130 as specified by the PROFIT ATP configuration table in the Rules 84 and in step 126, the modified record is added to the Demand file; otherwise, it is passed to step 132 for additional processing. In step 132, if the forecasted demand belongs to a different group, its demand class is changed in step 134 as specified by the PROFIT ATP configuration table in the Rules 84 and in step 126, the modified record is added to the Demand file; otherwise, it is passed to step 136 for additional processing.

4. If, in step 136, it is determined the order is not a move-out demand, a determination is made whether the demand record is a new request and if so, in step 138, the demand class is modified to the specified new request value, 6 in this example and, finally, in step 126, the modified demand record is passed to the Demand File for subsequent processing.

Thus, for the above example, a firm order has higher priority than a new request or a forecast. So, firm orders get higher priority in the PROFIT BCD run to ensure that commitments are met. Thus, the demand configuration of the preferred embodiment ensures that PROFIT BCD reallocates assets without altering existing order commitments and recommends proposals to meet new requests based on the enterprise's inventory and current demand.

The preferred embodiment single level BOM ATP system generates a single level BOM check from a supply line generated by the Regenerative ATP as described above with reference to FIG. 5. The Regenerative ATP check runs PROFIT BCD tool, i.e., the PROFIT ATP engine 88, for all of the enterprise's demands, providing the enterprise's supply line as its output. The output is provided at customer level and maps the supply against the demand using demand classes. The demand configuration process determines how supply is grouped for different customers in various forecast groups. Additionally, supply for a particular customer group can be designated as supply for various types of demands such as backorders, firm orders, order move-ins, order move-outs and new requests. Mapping supply to actual demand is an additional advantage of the preferred embodiment PROFIT ATP over traditional prior art systems.

The supply line determines what can be shipped to customers. Supply generated by the PROFIT ATP engine is generated for individual customer groups. The preferred embodiment PROFIT ATP system allows the system user to group together customers in forecast groups and, then, assign demand classes based on customer grouping. Each forecast group includes plant, material, customer and shipping location. Thus, if available resources are insufficient, then, by manipulating forecast group and demand class, the preferred embodiment PROFIT ATP engine estimates which demands will be met and, also, prioritizes manufacturing activity.

The preferred embodiment single level BOM PROFIT ATP avoids creating unnecessary fresh STARTS for requested material by running a single level BOM check on the PROFIT ATP engine. This is because instead of fresh STARTS, modified receipts and inventory data are used, as assets, to manage enterprise demands.

To accomplish this, referring back to step 102 in FIG. 5, the build options (BLDOPT) file is deleted before the single level BOM check PROFIT BCD run. Similarly, in step 104, all records from the receipt (RECIPT) file are deleted. A regenerative ATP check generates a supply line that is an input to the preferred embodiment single level BOM check. From this supply line, in step 108, all records are retrieved that match the combination of new request's (order) plant and material. These matching supply records are sorted, chronologically. The record matching the new request's plant and material combination is retrieved, in step 108, also, from the inventory (INV) file.

Then, in step 110, the inventory quantity is netted, chronologically, from retrieved supply line data. Next, the netted out supply is converted into receipts and stored in a RECEIPT file in step 114; the netted out quantity being a projected quantity and the projected date being the supply date. It is this new RECEIPT file created and new inventory file that are provided as assets to the single level BOM check.

Then, the PROFIT ATP Engine 88, i.e., PROFIT BCD, determines what can be built and when, to determine whether to accept an order. First, the PROFIT ATP engine 88 retrieves any necessary manufacturing data from planning resource 86. This manufacturing data is shared with planning tools driving the manufacturing processes. The demand classes of each demand/order are set according to the needs of the particular business enterprise which have preselected the demand's importance. The preferred embodiment PROFIT ATP system 80 uses the most current demands with their most current associate demand classes from the demand configurator 82.

For the preferred embodiment single level BOM ATP system, the PROFIT BCD heuristic is run on data received from Planning Source 86, modified receipt file (RECEIPT), modified build option file (BLDOPT) and modified bill of materials file (BOM), and the demands are configured, based on user-defined forecast groups and demand class.

Thus, the same solver planners driving the enterprise's manufacturing process, the PROFIT ATP engine 88, drives the single level BOM check. So, the solver generates a best-can-do match between existing assets and demands, across multiple facilities. Further, this match is based on manufacturing specifications, process flows, business policies and guidelines insuring that delivery commitments are met in a timely fashion. Thus, the preferred embodiment single level BOM PROFIT ATP provides a superior solution to prior art ATP systems.

The preferred embodiment PROFIT ATP system determines from the enterprise's modified receipts, i.e., from inventory on hand and substitution rules, how to manage best the demands on the enterprise. These demands are satisfied from the enterprise's receipts (i.e., supply in receipt format), the inventory of the requested material, and the inventory of the substituted material. The output of the PROFIT ATP engine 88 from the PROFIT BCD run is a supply line that matches demands as configured by the user.

The PROFIT ATP engine 88 automatically avoids over building binned parts and, therefore, minimizes the number of starts required for binned parts. Further, if end component demand is satisfied using binned sub-components, then, the PROFIT ATP engine 88 prevents manufacturing more sub-components than are required.

Additionally, semiconductor industry manufacturers can, at appropriate times, substitute equivalent parts. So, with the preferred embodiment, a semiconductor industry user can set time-periods wherein the preferred embodiment PROFIT ATP engine automatically makes necessary substitutions based on prior business decisions.

Further, identical or functionally identical semiconductor parts may be made by alternate processes. So, it is common practice to substitute parts from different processes, when appropriate. This allows the user to outsource certain operations over selected time-periods due to economic or capacity constraints, as necessary. The preferred embodiment PROFIT ATP engine 88 can handle these alternate processes, automatically, on-the-fly, an advantage that was unavailable on prior art ATP systems. As a result of the above advantages, the preferred embodiment Single Level BOM ATP system is superior to prior art PROFIT ATP systems.

So, after a new customer order is received and processed through the PROFIT ATP engine 88, the output of the PROFIT ATP engine 88, identifying what can be built and when, is passed to ATP Solver 90. The ATP Solver 90 processes that output according to the flow diagram of FIG. 6, determining how the order can be met from uncommitted supply.

To determine an optimum solution, the preferred ATP solver 90 processes a new order from a customer, first by taking all firm demands (back orders, firm orders, order move-in, order move-outs) in combination with reservations for the material requested. Then, the preferred ATP solver 90 reduces the total supply accordingly. This process, referred to as netting out, determines unallocated (free) supply available to fulfill (net out) the customer's new request.

In the preferred embodiment, each new order is netted out from supply identified for the customer from currently available supply, supply for the current and prior periods. If the order cannot be fulfilled from currently available supply, then, other same or lower priority customers' currently available supply is used to fill the order. If the order is still not fulfilled, then it is filled from future supply, i.e., supply to be produced and designated for the ordering customer or for customers with the same or lower priority. In the preferred embodiment, if earlier supply and/or future supply are required, available supply from time periods closest to the current time period is allocated first.

So, in step 140, all the firm demands in the demand file are sorted according to supplying plant, material, commit date, tier and rank. Also, all of the supply generated by the PROFIT ATP engine 88 is sorted according to its supplying plant, material, forecast group and date. Then, the total currently available supply is determined by reducing the total generated supply by the amount committed to all firm demands for the material or product requested in the order.

Then, in step 142, firm demands are selected for processing, individually. In step 144, the selected demand's forecast group is obtained from the PROFIT ATP rules table in the Business Rules 84. Currently available supply, committed to that forecast group is allocated from the current period. If in step 146, the order has been satisfied, then in step 148 the business rules are applied and a proposal is generated in step 150.

If in step 146, the order has still not been filled, then, in step 152, supply from earlier periods is made available and allocated in reverse chronological order, most recently available supply followed by older. After allocating supply from each period, the result is checked in step 154 to determine if the order is met. If, in step 154, it is determined that the order has been satisfied, then in step 148, the Business Rules 84 are applied to the ATP response, a proposal is generated and the proposed result is passed to ATP Solution 92 in step 150.

If, however, it is determined in step 154 that current supply is insufficient to meet the order, then, in step 156, the supply available to fill the order is supplemented from other, lower tier, forecast groups' currently available supply. So, after determining that supply, previously designated for other forecast groups of the same or lower priority is currently available, that previously designated supply is made available and allocated, as needed, according to steps 144-154. Again, the newly available supply is allocated in reverse chronological order, first in steps 144 and 146 from supply for the current period, followed if necessary in steps 152 and 154 by supply from prior periods, most recently available supply followed by older. If, in step 154, this additional supply from the lower tier forecast groups still does not satisfy the order; then, in step 156, more supply is made available from whatever remaining supply is designated for other lower tier forecast groups.

Once it is determined, in step 156, that all of the currently available supply for the lower tier forecast groups has been exhausted and the order is still unfilled (determined in step 154), then, in step 158, the supply is further supplemented with uncommitted future supply from future periods. The future supply is allocated first, from the ordering forecast group's supply in ascending chronological order. If the future supply for the forecast group placing the order is still insufficient to satisfy the shortfall, then, the supply is further supplemented with uncommitted future supply from forecast groups with the same or lower priority, again in ascending chronological order. Once it is determined, in step 160, that the order has been satisfied, then, in step 148, the Business Rules 84 are applied to the ATP response, a proposal is generated and the proposed result is passed to ATP Solution 92 in step 150.

If all supply, both currently available and future, for all same tier and lower tier forecast groups is allocated and the order remains unsatisfied in step 160, then, in step 162, the order is flagged (identified) as unsatisfied. The Business Rules 84 are applied to the flagged demand and, in step 150, a proposal is generated. The proposed result is passed to ATP Solution 92.

Figure 7:
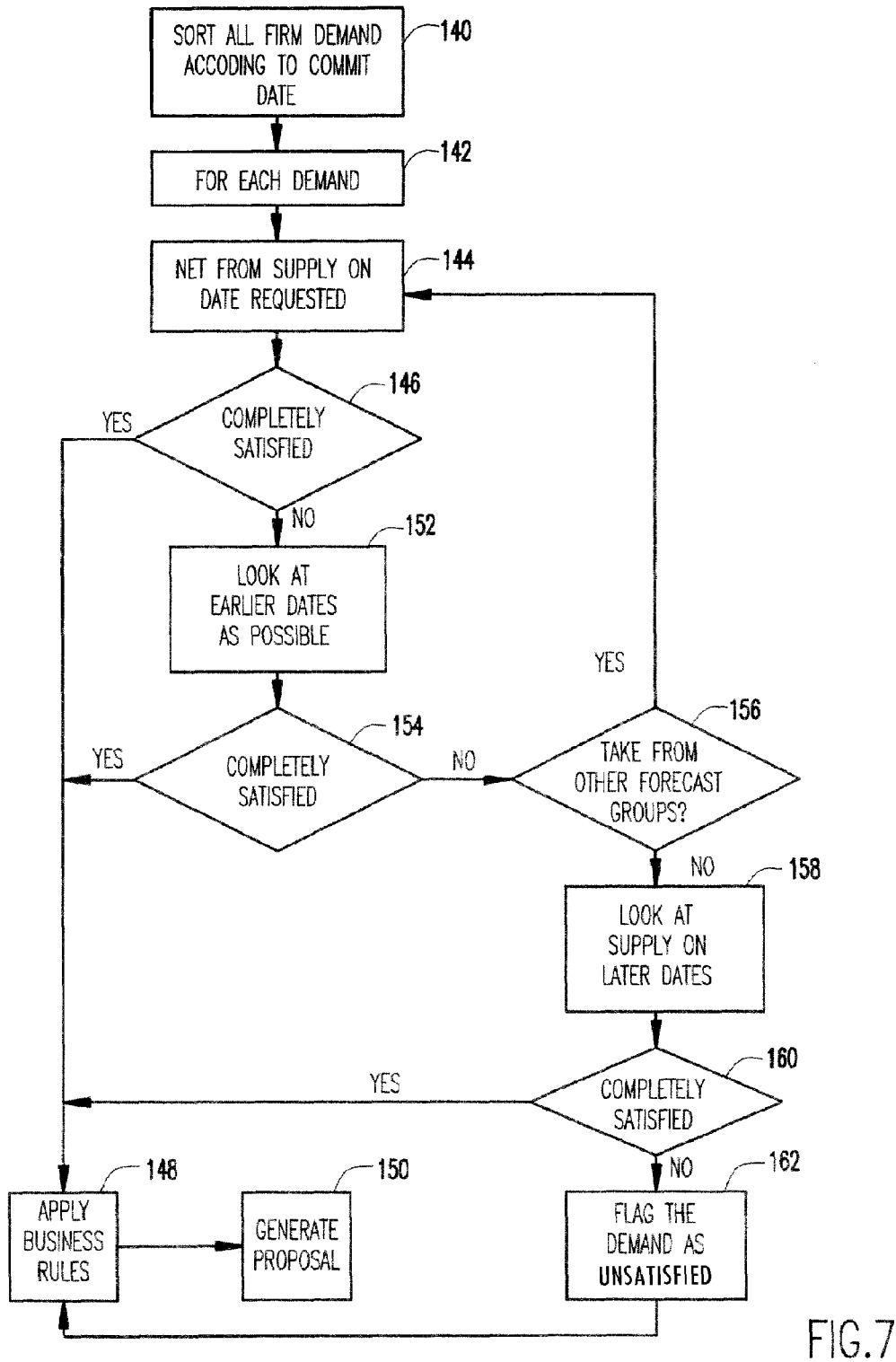
FIG. 7 shows the netting method followed by the preferred embodiment PROFIT ATP system.

Next, the solver nets out the reservations (i.e., orders from a lower tier forecast group than the firm orders) from remaining supply. First, all of the reservations in the reservation file are sorted according to supplying plant, material, commit date, tier and rank. Then, the balance of supply is used to net out all reservations for the requested material using the same method in FIG. 7 as described for netting out firm demands.

New requests coming into the preferred embodiment PROFIT ATP system are categorized either as an order move-in, an order move-out or, a new order. Periods are identified as frozen-zone periods for new requests with specific combinations of supplying plant and part number. If the new request is an order move-in or order move-out within an identified frozen zone period; then, prior old commitments for the order are held unchanged, the new request is flagged as an error and, the sending system is informed of the error. If, however, the order move-in or order move-out is beyond the frozen-zone period; then, the prior old commitment is replaced and treated as a new order.

New orders are processed, first by retrieving the new order's forecast group from the PROFIT ATP rules table. As with back orders, firm orders, order move ins and order move outs, the preferred embodiment PROFIT ATP tool consumes the least significant resource first, for each forecast group using substantially the same steps in FIG. 7 as used for higher priority orders. After a new request is met, the quantity, netted from supply, and the supply dates are stored as prospective order commit quantities and commit dates. Then, the next new order is processed until all new orders have been processed.

Finally, in the preferred embodiment tool, the ATP Solver 90 provides an ATP solution 92. In providing that ATP solution, in addition to recommending possible order fulfillment dates, the preferred embodiment PROFIT ATP system provides recommendations based on user-defined rules, as each individual customer desires. The preferred embodiment PROFIT ATP Solver 90 tunes its recommendations to individual customer requirements according to the enterprise's business rules 84.

To avoid repacking supply, for example, the business rules 84 can restrict supplied quantities to being multiples of a predetermined minimum shipping quantity (MSQ) for each material. In this example, the solution from the preferred embodiment PROFIT ATP system may recommend delaying orders until shipping quantities reach MSQ levels, ignoring the availability of partial quantities prior to the recommended date.

As provided hereinabove, the business rules 84 include customer requirements and enterprise order commitment policies. Both of these requirements or, rules are defined in a table in the Business Rules 84 in the preferred embodiment PROFIT ATP tool. By including both of these business and customer requirements in determining the solution, manual intervention is unnecessary, unlike traditional ATP systems for order fulfillment, which normally require such manual intervention.

Further, requested material, netted from total supply, is made available as the request can be filled. The business rules are applied to these prospective proposal quantities and dates to generate a ATP proposal as follows:

First, all proposal dates prior to the request date are moved to the requested date and all quantities corresponding to those dates are accumulated as being available at that date. It should be noted that, even though material may be available prior to the request date, it cannot be shipped until the requested date or thereafter.

Next, if the ATP Solution 92 is for an existing order (move-in); then, the preferred embodiment PROFIT ATP system ensures that order move-ins do not have commitment dates later than the order's original commit date. So, if, on the proposed solution date, the proposed solution provides for a smaller quantity either for existing commitments already in the demand file or for a new request; then, the proposed solution date is pushed back, order date by order date, until the proposed commit date is later than the existing order's original commit date. If, however, the proposed commit date is later than the existing order's original commit date; then, proposed commit date is changed to the existing order's original commit date.

Otherwise, if the ATP solution is for a new request; then, the preferred embodiment PROFIT ATP system completes the order recommendation based on customer preferences, as provided from the PROFIT ATP rules table. Customer preferences of order commitment is represented as two digit number greater than or equal to 01 and stored in the PROFIT ATP rules table.

So, for example, if the stored value is 01, then, the preferred embodiment PROFIT ATP system recommends the available quantity on the requested date. The request may be fully or, partially satisfied from this recommended quantity. All quantities from subsequent proposal dates are, then, freed for subsequent orders. Next, the supply is reserved for the ordering customer by making an entry in the Reservation File for the actual, committed quantity and date. This reservation is held until receipt of customer approval, or, upon expiration of a customer defined reservation time stored in the ATP rules table.

However, if the stored value is 02; then, for this example, the preferred embodiment PROFIT ATP system again recommends the available quantity on the requested date. The available quantity may fully or, only partially, satisfy the request. All other proposed dates and quantities, subsequent to the requested date are stored as soft reservations, internally, in the Reservation File. Next, the preferred PROFIT ATP system sends electronic mail (e-mail) informing the designated material owner of soft reservations being held against the order. The soft reservations are set to expire coincident with the actual request reservation.

If the stored value is 03, in his example the preferred embodiment PROFIT ATP system recommends the last date that the order can be completed. The request may be fully or partially satisfied on this recommended date or, alternately, a the customer may select a later date. The actual committed quantity and its commitment date are entered in the Reservation File.

However, if instead of being greater than 01, the stored value is 00; then, the preferred embodiment PROFIT ATP system determines from the PROFIT ATP rules table whether the customer can accept the order in multiple deliveries. If so, then multiple dates with corresponding proposed quantities are recommended. If, however, multiple deliveries are not acceptable, then, only the quantity available on the requested date is recommended. Again, this available quantity may only partially satisfy the request, with a recommendation of additional supply from a later date to satisfy the remain unsatisfied portion. Whichever proposal is accepted, the committed quantity and its committal date are entered in the Reservation File.

While the invention has been described in terms of preferred embodiments, those skilled in the art will recognize that the invention can be practiced with modification within the spirit and scope of the appended claims.

We claim:

1. A system for determining product availability, comprising:
   one or more order-entry system(s) comprising at least one demand source for inputting demand information; and
   a server having software modules stored thereon and having a processor operable to execute the software modules, the modules comprising
      a demand configurator for receiving demand information from each said at least one demand source and coordinating product requests responsive to said received demand information according to customer request rules and priorities, said rules and priorities including assignment of customers to a plurality of forecast groups;
      a supply configurator for receiving manufacturing and planning data from a planning source and manipulating said received manufacturing and planning data to a single level bill of material to create new supply data, supply being allocated by forecast group;
      a material resource engine for providing material supply information responsive to said new supply data, said received demand information and according to product supply rules and priorities, satisfaction of said product requests of a customer being restricted to supply allocated to the customer's forecast group;
      and a solver for optimizing product availability information to produce Profit ATP (Available To Promise) schedules for a plurality of forecast groups responsive to the material supply information and product supply rules and priorities,
      wherein the supply configurator creates said new supply data from a last regenerative run of said material resource engine.

2. The system of claim 1 wherein the supply configurator deletes from said received demand information all build options and all receipts to create said new supply data.

3. The system of claim 1, wherein the demand configurator determines how supply is grouped for a plurality of customers in said plurality of forecast groups.

4. The system of claim 1, wherein supply is mapped against actual demand.

5. The system of claim 1, wherein supply for a particular customer group can be designated as supply for a plurality of demand types.

6. The system of claim 5, wherein said plurality of demand types includes backorders, firm orders, order move-ins, order move-outs and new requests.

7. A computer implemented method for determining product availability, the computer perfroming steps comprising:
   retrieving demand information from one or more demand sources;
   coordinating product requests responsive to said received demand information according to customer request rules and priorities, said rules and priorities including assignment of customers to a plurality of forecast groups;
   receiving manufacturing and planning data from a planning source and manipulating said received manufacturing and planning data to a single level bill of material to create new supply data responsive to said coordinated requests, supply being allocated by forecast group;

providing material supply information responsive to said new supply data, said received demand information and according to product supply rules and priorities, satisfaction of said product requests of a customer being restricted to supply allocated to the customer's forecast group;

and optimizing product availability information to produce Profit ATP schedules for a plurality of forecast groups responsive to the material supply information and product supply rules and priorities, wherein the receiving step creates said new supply data from a last regenerative run of said material resource engine.

8. The computer implemented method of claim 7 wherein in the receiving step all build options and all receipts are deleted from said received demand information to create said new supply data.

9. The computer implemented method of claim 7, wherein in the coordinating step a determination is made how supply is grouped for a plurality of customers in said plurality of forecast groups.

10. The computer implemented method of claim 7, wherein supply is mapped against actual demand.

11. The computer implemented method of claim 7, wherein supply for a particular customer group is designated as supply for a plurality of demand types.

12. The computer implemented method of claim 11, wherein said supply for a particular customer group is designated as either backorders, firm orders, order move-ins, order move-outs or new requests.

13. A computer program product comprising:

a computer usable medium having computer readable program code embodied in said medium for determining product availability, said computer program product having:

first computer program code for retrieving demand information from one or more demand sources;

second computer program code for coordinating product requests responsive to said received demand information according to customer request rules and priorities, said rules and priorities including assignment of customers to a plurality of forecast groups;

third computer program code for receiving manufacturing and planning data from a planning source and manipulating said received manufacturing and planning data to a single level bill of material to create new supply data responsive to said coordinated requests, supply being allocated by forecast group;

fourth computer program code for providing material supply information responsive to said new supply data, said received demand information and according to product supply rules and priorities, satisfaction of said product requests of a customer being restricted to supply allocated to the customer's forecast group;

and fifth computer program code for optimizing product availability information to produce Profit ATP (Available To Promise) schedules for a plurality of forecast groups responsive to the material supply information and product supply rules and priorities, wherein said third computer code creates said new supply data from a last regenerative run of said fourth computer code.

14. The computer program product of claim 13 wherein in the third computer program code all build options and all receipts are deleted from said received demand information to create said new supply data.

15. The computer program product of claim 13, wherein in the second computer program code a determination is made how supply is grouped for a plurality of customers in said plurality of forecast groups.

16. The computer program product of claim 13, wherein supply is mapped against actual demand in the second computer program code.

17. The computer program product of claim 13, wherein supply for a particular customer group is designated as supply for a plurality of demand types in the second computer program code.

18. The computer program product of claim 17, wherein said supply for a particular customer group is designated as either backorders, firm orders, order move-ins, order move-outs or new requests in the second computer program code.

* * * * *